3,076,398
CAMERA DIAPHRAGMS AND AUTOMATIC CONTROL MEANS THEREFOR

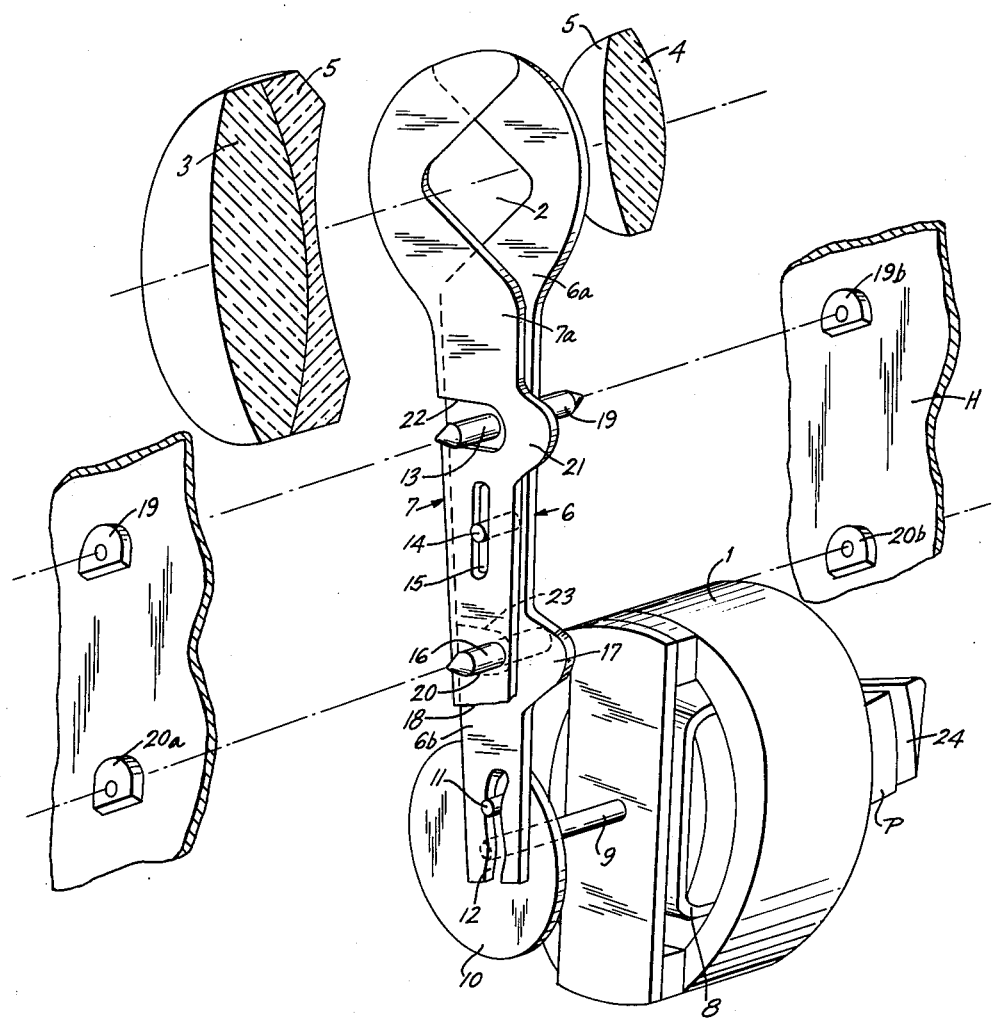

Erich Hahn and Werner Hahn, Dresden, Germany, assignors to VEB Kamera- und Kinowerke Dresden, Dresden, Germany
Filed Dec. 24, 1959, Ser. No. 861,885
16 Claims. (Cl. 95—64)

The present invention relates to improvements in diaphragms or stops for cameras and motion-picture cameras in general, and more particularly to a two-piece diaphragm combined with control means for automatically regulating the aperture through which the light is admitted to the optical system of such apparatus, and in which the automatic regulation of the light aperture is brought about by electric current generated in a photoelectric cell.

Before proceeding with the detailed description of various objects as well as of the exact construction and mode of operation of our invention, we will now describe certain known types of diaphragms and control means therefor by simultaneously pointing out such drawbacks of the prior systems which are overcome by the improved construction of our invention.

It is already known to provide a fully automatic control system for regulating the light apertures of diaphragms or stops in many cameras and motion-picture cameras of presently utilized design. According to one prior proposal, the diaphragm consists of several leaves and the automatic control or regulating system therefor comprises a moving-coil meter for each leaf, each meter having a coil connected with one of the leaves for moving the same with respect to the other leaves so as to vary the light aperture of the composite multi-leaf diaphragm. Each meter is supplied with electric current by a photoelectric cell which receives current impulses of various magnitude depending upon the light admission to the cell.

Alternately, the leaves may be articulately connected to each other by flexible cord-like elements and their movements controlled by the coil of a single moving-coil instrument. In the just described types of diaphragms, also known as iris diaphragms, the leaves are shaped in such a manner that, in each of their positions, they form a light aperture of approximately circular, and more particularly of a regular polygonal contour, i.e. the light passes through the lens within the confines outlined by, say, eight or more leaves which form an eight- or more sided light aperture. In a somewhat modified construction, two or more overlapping diaphragm leaves are formed with arcuate slots or cutouts which, depending on the angular position of the leaves with respect to each other, overlap to a greater or lesser extent to in such manner define a light aperture of requisite area. In this modified construction, the leaves are movable by the coil or coils of one or more moving-coil instruments.

A serious disadvantage of all hereinabove described prior diaphragm controls is that the coils of the moving-coil instruments are subjected to very heavy stresses since they must, either directly or at least indirectly, support one or more leaves of which the diaphragm consists and must also carry or move, by means of cords or like flexible elements, the counterweights which are utilized for balancing the leaves. Thus, the moving-coil instruments or meters must generate a force sufficient not only for moving the leaves with respect to each other but also an additional force which is necessary for carrying, or overcoming the friction of, various counterweights and of the flexible elements which connect the counterweights with the leaves. Such friction is even increased owing to the provision of guide channels which are necessary for maintaining the leaves in a single plane. In addition, whenever the diaphragm utilizes cord-like flexible elements for connecting its leaves to each other and/or with the counterweights, the danger that the flexible elements will expand is ever present, which leads to improper exposure of the photosensitive material owing to inaccurate setting of the diaphragm leaves.

A satisfactory fully automatic control and regulating system for the diaphragms of cameras and motion-picture cameras should operate in such a way that each change in the intensity of illumination upon the photoelectric cell by a factor 2 should bring about a change, equally by a factor 2, in the area of the light aperture defined by the diaphragm leaves. However, owing to certain current characteristics of the photoelectric element and of the moving-coil instrument means, which characteristics cannot always be calculated with sufficient accuracy, certain corrective measures must be undertaken to compensate for aberrations in all such types of diaphragm controls. Many presently known and utilized control systems for the diaphragms in cameras and motion-picture cameras neglect such corrections; therefore, their usefulness is limited to such photographic equipment which is not expected to operate with a high degree of accuracy. We will now proceed to describe certain presently known methods of and means for correcting such aberrations.

It was already suggested to correct the movements of leaf-shaped elements of which the diaphragm consists by the provision of a plurality of correcting or rectifying cams mounted directly on the coil of the moving-coil instrument. The cams cause controlled movements of diaphragm leaves into a series of positions to vary the light aperture of the diaphragm. One end of each leaf carries a follower roller or pin which is permanently biased into engagement with the cam by a coil spring, a leaf spring, or other resilient means. The very small angular momentum imparted to the coil by the current supplied through the output circuit of the photoelectric cell not only must overcome the weight of the leaves and of the cam means but must also counteract the frictional forces generated by the permanently acting resilient means between the followers of the individual leaves and the cam means since any movements performed by the leaves must be brought about by the cam means whose cam surfaces transmit movement to the leaves through the respective follower rollers. Consequently, the usefulness of such diaphragm controlling systems is very limited because they will react only when the photoelectric element is exposed to an illumination of very high intensity. An additional drawback of such diaphragm controls is that they require a cam for each individual blade or leaf of the diaphragm. Since the leaves pivot about axes which do not coincide with the axis of the moving-coil instrument, the cams must be finished with utmost precision and must be installed with an extremely high degree of accuracy if a satisfactory degree of correction is to be attained. It will be readily understood that the manufacture and mounting of such diaphragms and of control means therefor are time-consuming and greatly increase the cost of photographic equipment which embodies the same.

In other types of diaphragm controls in which the moving-coil instrument controls the movements of individual diaphragm leaves by means of cord-like flexible elements, the corrections of aforementioned aberrations in the movements of diaphragm leaves are brought about by the provision of eccentric guide means, such as rollers, sheaves, shafts or the like, over which the flexible elements are led and which thus affect the movements of the diaphragm leaves. However, the provision of guiding and tensioning rollers or the like again generates additional frictional forces which must be overcome by the coil or coils of the moving-coil instrumentalities. In addition, such cord guiding and tensioning means cannot fully compensate for the aberrations, i.e. they will only partially correct the disproportionation between the changes in the light admission to the photoelectric cell and the desired angular displacement of the coil or coils which, through the aforementioned flexible elements, control the movements of diaphragm leaves.

Another known fully automatic diaphragm control comprises moving-coil instruments whose coils are connected with the diaphragm leaves by means of suitable motion transmitting gearing in order to vary the light aperture in conformity with the variations in light admission to the photoelectric cell. Such systems share the disadvantage of certain previously described controls in that the moving coil or coils must operate a series of additional parts and must also overcome the friction between such parts and the bearings and pivot axles on which the moving parts are mounted. This reduces the efficiency and sensitivity of such diaphragm controls, and also increases the manufacturing cost. In addition, a diaphragm control utilizing motion transmitting gears is unreliable and cannot fully compensate for the aberrations.

In accordance with a still further prior proposal, the diaphragm comprises a pair of relatively movable leaves the first of which is mounted directly on the pivot axle of the moving coil and drives the second leaf through a system of toothed gears, segments or the like. The second leaf is pivotally mounted in the camera housing and carries toothed parts which are in mesh with the toothed members of the first leaf. The synchronization of movements performed by the diaphragm leaves either to enlarge or to reduce the light aperture upon variations in the light admission to the photoelectric cell is brought about by a light absorbing or dimming member which is mounted on the pivot axle of the moving coil. The light absorbing member may consist of a segmental or sector-shaped shield which screens or covers the photoelectric cell to a larger or lesser extent, depending upon the intensity of light to which the photoelectric cell is exposed. A drawback of such diaphragm controls is that the photoelectric cell must be mounted immediately adjacent to the moving-coil instrument because the latter must vary the position of the light absorbing member which, as described hereinabove, must in turn be located in front of the photoelectric cell. Consequently, such diaphragm controls can be utilized only in certain types of cameras because they occupy a certain amount of space not available in all cameras of presently utilized design.

An important object of the present invention is to provide a diaphragm control which is capable of fully compensating for the current aberrations in the photoelectric cell and in the moving-coil instrumentalities utilized therein.

Another object of the invention is to provide a diaphragm controlling and regulating system which is capable of operating with a very high degree of accuracy, in which the energy losses owing to friction and weight of parts are reduced to a minimum, and which consists of a very small number of component parts.

A further object of the invention is to provide a fully automatic diaphragm control of the above outlined characteristic which operates without springs and which does not not require flexible elements or tensioning rollers for operatively connecting the diaphragm leaves to each other.

A still further object of the instant invention is to provide a diaphragm control which is of lightweight construction, which occupies very little space, and which may be readily installed in nearly all cameras or motion-picture cameras of presently utilized design.

Still another object of the invention is to provide a fully automatic diaphragm control which operates with a very high degree of accuracy and which is capable of accurately controlling the light aperture over the entire range of illuminations to which the photoelectric cell may be exposed.

A concomitant object of the present invention is to provide an improved diaphragm for cameras and motion-picture cameras which requires very small forces for moving its leaves into an infinite number of positions with respect to each other for varying the light aperture of the diaphragm.

With the above objects in view, the invention resides in the provision of a fully automatic control system which regulates a diaphragm consisting of two crosswise arranged leaves, each formed as a two-armed lever and each pivotally mounted in the housing of the camera at a point which coincides with its center of gravity but does not coincide with the pivot axis of the moving-coil instrument which latter forms part of the diaphragm control. Owing to such mounting of the lever-shaped leaves, very small forces are required to move the same with respect to each other in order to vary the light aperture of the diaphragm. The control system comprises a photoelectric cell whose output circuit is connected with the aforementioned moving-coil meter. The moving coil of the meter is operatively connected with one of the lever-shaped leaves by means of a cam slot and driving pin assembly, and a similar operative connection is provided between said one and the other leaf of the diaphragm. It is preferred to connect the moving coil with one of the leaves in such a way that the leaf is formed with a straight but preferably arcuate cam slot, and that the spindle of the coil carries a discoid member provided with an eccentric driving pin extending into the cam slot to rotate the leaf when the photoelectric cell conveys a current impulse to the moving-coil meter. The operative connection between the two-armed levers or leaves of the diaphragm constitutes a coupling which operates in such a way that the leaves are simultaneously moved in opposing directions whenever the movable coil responds to changes in light conditions to which the photoelectric cell is exposed.

Since no springs are required, and since the improved diaphragm comprises only two fully balanced leaves, very small current impulses will cause the control system to react and to displace the leaves with respect to each other in response to extremely small variations in light intensity to which the photoelectric cell is exposed. Consequently, the novel system is one of very great accuracy and efficiency and, since it consists of a small number of component parts, may be readily installed in practically all cameras and motion-picture cameras of presently utilized design.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawing the single illustration of which is a perspective view of the improved two-leaf diaphragm and of the novel control and regulating system therefor.

Referring now in greater detail to the drawing, there is shown a diaphragm consisting of two crossing leaves 6, 7, each formed as a two-armed lever and each having an arm 6a, 7a, respectively, constituting the means for defining the variable light aperture 2. The lever or leaf 6 is pivotable about a shaft or pivot axle 19 which is held in suitable bearings 19a, 19b forming part of or connected to the camera housing H in which the diaphragm is installed. The axis of the shaft 19 coincides with the center of gravity 13 of the lever 6. The other lever or leaf 7 is mounted in similar fashion on a second shaft or pivot axle 20 which is parallel with the shaft 19 and is carried by bearings 20a, 20b mounted in the camera housing H. Again, the center of gravity 16 of the lever 7 coincides with the axis of its pivot axle 20. Owing to such mounting of the levers 6 and 7, a comparatively small force is required for moving the same with respect to each other in order to vary the area of the light aperture 2. The optical system of the camera comprises an objective 5 including a combination of lenses 3, 4 at the opposing sides of the arms 6a, 7a.

The control or regulating system for the diaphragm leaves 6, 7 comprises a photoelectric cell P which is built into the camera housing and whose output circuit is electrically connected with a magnetic core meter 1. The latter comprises a moving coil 8 which is rigidly fixed to a spindle 9; this spindle is parallel with the shafts 19, 20 and supports a concentric disc 10 formed with or connected to an eccentric driving pin 11 which extends into an arcuate slot 12 formed in the second arm 6b of the diaphragm leaf 6. The operative connection between the leaves 6, 7 comprises a straight cam slot 15 formed in the lever 7 and a sliding pin 14 connected to the lever 6 and extending into the slot 15. The coupling consisting of the cam slot 15 and pin 14 is provided at a point between the parallel shafts 19, 20. The lever or leaf 6 is formed with a laterally extending protuberance 17 which serves as a balancing means, and a similar balancing means 21 is provided on the other lever 7. The balancing means 21 may be replaced by a counterweight connectable to the broken-off free end 18 of the lever 7. The lever 6 is further provided with a cutout 22 which loosely receives the shaft 19, and a similar cutout 23 in the lever 7 surrounds with ample play the shaft 20. The recesses or cutouts 22, 23 permit unobstructed pivotal movements of the levers 6, 7 with respect to each other but always in opposing directions.

If it is desired to take into consideration the illumination or light intensity factor, a manually adjustable wedge 24 of increasing density may be provided in front of the photoelectric cell P or, alternately, the wedge 24 may be replaced by a non-represented variable resistance which is then connected in parallel with the photoelectric cell.

The improved diaphragm 6, 7 and the novel control means therefor operate as follows:

The photoelectric current which is generated in the photoelectric cell P by the light reflected from an image brings about a rotary movement of the coil 8 and hence also of the spindle 9 and discoid member 10. The eccentric driving pin 11 of the disc 10 engages with the walls of the open slot 12 and pivots the lever-shaped diaphragm leaf 6 about the latter's axle 19. During such movement of the lever 6, the pin 14 slides along the walls of the closed slot 15 and pivots the second lever-shaped leaf 7 about the shaft 20 but in a direction opposed to that in which the leaf 6 pivots. Thus, if the disc 10 is rotated in clockwise direction to reduce the light aperture 2, the leaf 6 will pivot anticlockwise about the shaft 19 and will simultaneously swing the second leaf in clockwise direction. Accordingly, the extent to which the light aperture 2 will be enlarged or reduced depends upon the extent to which the coil 8 turns the disc 10 and the latter's eccentric driving pin 11. In other words, the intensity of illumination to which the photoelectric cell P is exposed, the strength of the current generated in the photoelectric cell, and the angular displacement of the coil 8 will determine the exact area of the light aperture.

The shape of the curved or substantially sinusoidal open slot 12 in the arm 6b of the lever-shaped diaphragm leaf 6 is selected in such a way that the momentary area of the light aperture 2 defined by the lever arms 6a, 7a corresponds exactly to the momentary intensity of light to which the photoelectric cell P is exposed. Thus, any changes in illumination upon the cell P by a factor 2 will bring about a change in the area of light aperture 2 by a factor $\sqrt{2}$. This is attained by positioning the pin 11 and by shaping the slot 12 in such a manner that successive angular movements of equal magnitude performed by the pin 11 will cause progressively decreasing pivotal movements of the lever or leaf 6. This is attainable even if the slot 12 is formed as a straight recess or cutout. The provision of an arcuate slot 12 is intended to control with very great accuracy the pivoting movements of the levers 6, 7, i.e. the curved slot 12 will adapt the movements of these levers to the current characteristics of the meter 1 and of the photoelectric cell P.

In order to take into consideration the illumination factors, the adjustable wedge 24 in front of the cell P is brought into desired position which renders it possible to fully utilize the entire area of the photoelectric cell during each measurement, i.e. during measurements under varying illuminating conditions.

As stated hereinbefore, the points about which the levers 6, 7 pivot coincide with their centers of gravity 13, 16, respectively; therefore, the levers are in perfect balance and comparatively small forces are required to pivot the levers with respect to each other. The balance of the levers 6, 7 is further improved by the provision of projections 17, 21, respectively. In addition, since the composite or two-piece diaphragm 6, 7 and its connection with the coil 8 of the control means comprises a very small number of component parts (that is, the spindle 9, the disc 10, the pin 11 and the pin 14), the frictional forces are also very small which adds to the sensitivity, efficiency and accuracy of the improved diaphragm. The operation of the control system is fully automatic and, due to the simplicity of the diaphragm and of the control means therefor, the entire system occupies very little space and may be readily installed in practically all types of cameras and motion picture cameras of presently utilized design.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the appended claims.

What is claimed as new and desired to be secured by Letters Patent is:

1. In a camera housing, in combination: a diaphragm comprising a pair of crossing lever-shaped leaves, said leaves defining a light aperture and each mounted in the housing for pivotal movements about its center of gravity; means comprising a pin-and-slot connection for coupling said levers for simultaneous movements in opposing directions to vary the area of said light aperture; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said last mentioned connection comprising an eccentric driving pin operatively connected to and movable by said coil, and a cam slot formed in said one leaf for slidably receiving the driving pin.

2. In a camera housing, in combination: a diaphragm comprising a pair of crossing lever-shaped leaves, said leaves defining a light aperture and each mounted in the housing for pivotal movements about its center of gravity; means comprising a pin-and-slot connection for coupling said levers for simultaneous movements in opposing directions to vary the area of said light aperture; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said last mentioned connection comprising an eccentric driving pin operatively connected to and movable by said coil, and a straight cam slot formed in said one leaf for slidably receiving the driving pin.

3. In a camera housing, in combination: a diaphragm comprising a pair of crossing lever-shaped leaves, said leaves defining a light aperture and each mounted in the housing for pivotal movements about its center of gravity; means comprising a pin-and-slot connection for coupling said levers for simultaneous movements in opposing directions to vary the area of said light aperture; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said last mentioned connection comprising an eccentric driving pin operatively connected to and movable by said coil, and a curved cam slot formed in said one leaf for slidably receiving the driving pin.

4. In a camera having a housing, in combination: a diaphragm comprising a pair of crossing lever-shaped leaves, said leaves defining a light aperture and each mounted in the housing for pivotal movements about its center of gravity; means comprising a pin-and-slot connection for coupling said levers for simultaneous movements in opposing directions to vary the area of said light aperture; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said last-mentioned connection comprising a spindle coaxially connected to and angularly movable with said coil, a disc connected to said spindle, a driving pin eccentrically connected to said disc, and a cam slot formed in one of said leaves and slidably receiving said driving pin for pivoting said one leaf when the coil is angularly displaced.

5. In a camera having a housing, in combination: a diaphragm comprising a pair of crossing lever-shaped leaves, said leaves defining a light aperture and each mounted in the housing for pivotal movements about its center of gravity; means comprising a pin-and-slot connection for coupling said levers for simultaneous movements in opposing directions to vary the area of said light aperture; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said last-mentioned connection comprising a spindle coaxially connected to and angularly movable with said coil, a disc concentrically connected to said spindle, a driving pin eccentrically connected to said disc, and a cam slot formed in one of said leaves and slidably receiving said driving pin for pivoting said one leaf when the coil is angularly displaced, said last mentioned connection being such that said one leaf performs progressively decreasing angular movements in response to successive movements of said coil through angles of constant magnitude.

6. In a camera having a housing, in combination: two parallel shafts each mounted in said housing; a diaphragm comprising a pair of leaves, each of said leaves comprising a two-armed lever and each connected to one of said shafts in such a manner that its center of gravity coincides with the point about which it is rotatable on the respective shaft with respect to said housing, one arm of one of said leaves defining with one arm of the other leaf a variable light aperture; means coupling said leaves for simultaneous movements in opposing directions to vary the area of said light aperture, said coupling means comprising a cam slot formed in one of said leaves and a pin slidably received in said cam slot and connected to the other leaf; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said connection comprising an eccentric driving pin operatively connected to and movable by said coil and a second cam slot formed in the other arm of said one leaf for slidably receiving the driving pin.

7. In a camera having a housing, in combination: two parallel shafts each mounted in said housing; a diaphragm comprising a pair of leaves, each of said leaves comprising a two-armed lever and each connected to one of said shafts in such a manner that its center of gravity coincides with the point about which it is rotatable on the respective shaft with respect to said housing, one arm of one of said leaves defining with one arm of the other leaf a variable light aperture; means coupling said leaves for simultaneous movements in opposing directions to vary the area of said light aperture, said coupling means comprising a cam slot formed in one of said leaves and a pin slidably received in said cam slot and connected to the other leaf; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said connection comprising a spindle parallel with said shafts, said spindle coaxially connected to and rotatable by said coil, a disc concentrically connected to said spindle, a driving pin eccentrically connected to said disc, and a second cam slot formed in the other arm of said one leaf for slidably receiving said driving pin.

8. In a camera having a housing, in combination: two parallel shafts each mounted in said housing; a diaphragm comprising a pair of leaves, each of said leaves comprising a two-armed lever and each connected to one of said shafts in such a manner that its center of gravity coincides with the point about which it is rotatable on the respective shaft with respect to said housing, one arm of one of said leaves defining with one arm of the other leaf a variable light aperture; means for balancing each of said leaves; means coupling said leaves for simultaneous movements in opposing directions to vary the area of said light aperture, said coupling means comprising a cam slot formed in one of said leaves and a pin slidably received in said cam slot and connected to the other leaf; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said connection comprising an eccentric driving pin operatively connected to and movable by said coil, and a second cam slot formed in the other arm of said one leaf for slidably receiving the driving pin.

9. In a camera having a housing, in combination: two parallel shafts each mounted in said housing; a diaphragm comprising a pair of leaves, each of said leaves comprising a two-armed lever and each connected to one of said shafts in such a manner that its center of gravity coincides with the point about which it is rotatable on the respective shaft with respect to said housing, one arm of one of said leaves defining with one arm of the other leaf a variable light aperture; means coupling said leaves for simultaneous movements in opposing directions to vary the area of said light aperture, said coupling means comprising a cam slot formed in one of said leaves intermediate said shafts and a pin slidably received in said cam slot and connected to the other leaf; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said connection comprising an eccentric driving pin operatively connected to and movable by said coil, and a second cam slot formed in the other arm of said one leaf for slidably receiving the driving pin.

10. In a camera having a housing, in combination: two parallel shafts each mounted in said housing; a diaphragm comprising a pair of leaves, each of said leaves comprising a two-armed lever and each connected to one of said shafts in such a manner that its center of gravity coincides with the point about which it is rotatable on the respective shaft with respect to said housing, one arm of one of said leaves defining with one arm of the other leaf a variable light aperture; means coupling said leaves for simultaneous movements in opposing directions to vary the area of said light aperture, said coupling means comprising a straight cam slot formed in one of said leaves and a pin slidably received in said cam slot and connected to the other leaf; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said connection comprising an eccentric driving pin operatively connected to and movable by said coil, and a second cam slot formed in the other arm of said one leaf for slidably receiving the driving pin.

11. In a camera having a housing, in combination: two parallel shafts each mounted in said housing; a diaphragm comprising a pair of leaves, each of said leaves comprising a two-armed lever and each connected to one of said shafts in such a manner that its center of gravity coincides with the point about which it is rotatable on the respective shaft with respect to said housing, one arm of one of said leaves defining with one arm of the other leaf a variable light aperture; means coupling said leaves for simultaneous movements in opposing directions to vary the area of said light aperture, said coupling means comprising a cam slot formed in one of said leaves and a pin slidably received in said cam slot and connected to the other leaf; and a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said connection comprising an eccentric driving pin operatively connected to and movable by said coil, and an open second cam slot formed in the other arm of said one leaf for slidably receiving the driving pin.

12. In a camera having a housing, in combination: an objective mounted in said housing; two spaced parallel shafts each rotatably mounted in said housing; a diaphragm comprising a pair of leaves, each of said leaves comprising a two-armed lever and each connected with one of said shafts in such manner that its center of gravity coincides with the point about which it is rotatable with the respective shaft relative to said housing, one arm of one of said leaves defining with one arm of the other leaf a variable light aperture for said objective; means for balancing said leaves; means coupling said leaves for simultaneous movements in opposing directions to vary the area of said light aperture, said coupling means comprising a cam slot formed in one of said leaves intermediate said shafts and a pin slidably received in said cam slot and connected to the other leaf; and a control system for said diaphragm comprising a photoelectric cell mounted in the housing, a moving-coil meter electrically connected in the output circuit of said coil and comprising a moving coil which is angularly movable in response to current impulses conveyed by said cell to said meter, and an operative connection between one of said leaves and said coil, said connection comprising a spindle coaxially connected with the coil for rotation therewith and parallel with said shafts, a disc concentrically connected with said spindle, a driving pin eccentrically connected with said disc, and a second cam slot formed in the other arm of said one leaf for slidably receiving the driving pin, said coil adapted to pivot said one leaf through said driving pin so that said coupling means may turn the other leaf whereby the first mentioned arms of said leaves vary the area of said light aperture.

13. In a camera housing, in combination: a diaphragm comprising a pair of crossing lever-shaped leaves, said leaves defining a light aperture and each mounted in the housing for pivotal movements about its center of gravity; means comprising a pin-and-slot connection for coupling said levers for simultaneous movements in opposing directions to vary the area of said light aperture; a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said last mentioned connection comprising an eccentric driving pin operatively connected to and movable by said coil, and a cam slot formed in said one leaf for slidably receiving the driving pin; and a manually adjustable wedge of varying density movably mounted in front of said photoelectric cell.

14. In a camera housing, in combination: a diaphragm comprising a pair of crossing lever-shaped leaves, said leaves defining a light aperture and each mounted in the housing for pivotal movements about its center of gravity; means comprising a slot-and-pin connection for coupling said levers for simultaneous movements in opposing directions to vary the area of said light aperture; a control system for said diaphragm comprising a photoelectric cell mounted in the housing, a moving-coil meter electrically connected in the output circuit of said cell and comprising a moving coil which is angularly movable in response to current impulses conveyed by said cell to said meter, and an operative connection between one of said leaves and said coil, said last mentioned connection comprising an eccentric driving pin operatively connected to and movable by said coil, and a cam slot formed in said one leaf for slidably receiving the driving pin; and a variable resistance connected in parallel with said photoelectric cell.

15. In a camera having a housing, in combination: a diaphragm comprising a pair of crossing lever-shaped leaves, said leaves defining a light aperture and each mounted in the housing for pivotal movements about its center of gravity; means comprising a pin-and-slot connection for coupling said levers for simultaneous movements in opposing directions to vary the area of said light aperture; and a control system for said diaphragm comprising a photoelectric cell mounted in the housing, a magnetic core meter electrically connected in the output circuit of said cell and comprising a moving coil which is angularly movable in response to current impulses conveyed by said cell to said meter, and an operative connection between one of said leaves and said coil, said last mentioned connection comprising a spindle coaxially connected to and rotatable by said coil, a disc concentrically connected to said spindle, a driving pin eccentrically connected to said disc, and a cam slot formed in one of said leaves and slidably receiving said driving pin for pivoting said one leaf when the coil is angularly displaced.

16. In a camera having a housing, in combination: an objective mounted in said housing; two spaced parallel shafts each rotatably mounted in said housing; a diaphragm comprising a pair of leaves, each of said leaves comprising a two-armed lever and each connected with one of said shafts in such manner that its center of gravity coincides with the point about which it is rotatable with the respective shaft relative to said housing, one arm of one of said leaves defining with one arm of the other leaf a variable light aperture for said objective; means for balancing said leaves; means coupling said leaves for simultaneous movements in opposing directions to vary the area of said light aperture, said coupling means comprising a cam slot formed in one of said leaves intermediate said shafts and a pin slidably received in said cam slot and connected to the other leaf; and a control system for said diaphragm comprising a photoelectric cell mounted in the housing, a magnetic core meter electrically connected in the output circuit of said coil and comprising a movable coil which is angularly movable in response to current impulses conveyed by said cell to said meter, and an operative connection between one of said leaves and said coil, said connection comprising a spindle coaxially connected with and turnable by said coil, said spindle parallel with said shafts, a disc concentrically connected with said spindle, a driving pin eccentrically connected with said disc, and a substantially sinusoidal second cam slot formed in the other arm of said one leaf for slidably receiving the driving pin, said coil adapted to pivot said one leaf through said driving pin so that said coupling means may move the other leaf whereby the first mentioned arms of said leaves vary the area of said light aperture.

References Cited in the file of this patent

UNITED STATES PATENTS

| 2,369,473 | Luboshez | Feb. 13, 1945 |
| 2,421,499 | Guedon | June 3, 1947 |
| 3,024,715 | Wittel et al. | Mar. 13, 1962 |

FOREIGN PATENTS

| 661,893 | Great Britain | Nov. 28, 1951 |
| 1,193,902 | France | May 4, 1959 |